(12) United States Patent
Casavant et al.

(10) Patent No.: US 12,229,623 B1
(45) Date of Patent: Feb. 18, 2025

(54) WIRELESS TAG CALIBRATION

(71) Applicant: Wiliot, Ltd., Caesarea (IL)

(72) Inventors: Eric Casavant, San Diego, CA (US); Eli Sorin, Tel Aviv (IL); Prasaanth Balakrishnan, San Diego, CA (US); Stephen Statler, San Diego, CA (US); Dotan Ziv, Tel Aviv (IL); Vyshakh Babji, Half Moon Bay, CA (US); Dilnur Yuldashev, New York, NY (US)

(73) Assignee: Wiliot, Ltd., Caesarea (IL)

( * ) Notice: Subject to any disclaimer, the term of this patent is extended or adjusted under 35 U.S.C. 154(b) by 0 days.

(21) Appl. No.: 18/399,134

(22) Filed: Dec. 28, 2023

(51) Int. Cl.
*G06K 7/10* (2006.01)
(52) U.S. Cl.
CPC ................. *G06K 7/10366* (2013.01)
(58) Field of Classification Search
CPC .................................................. G06K 7/10366
USPC ........................................................ 235/451
See application file for complete search history.

(56) References Cited

U.S. PATENT DOCUMENTS

| 2006/0290496 | A1* | 12/2006 | Peeters | G01D 21/00 340/572.1 |
| 2010/0285571 | A1* | 11/2010 | Coursey | G01K 15/00 374/185 |
| 2020/0072682 | A1* | 3/2020 | Rümler | G01K 7/427 |
| 2023/0065309 | A1* | 3/2023 | Faulkner | G06K 7/10148 |

* cited by examiner

Primary Examiner — Daniel A Hess
(74) Attorney, Agent, or Firm — M&B IP Analysts, LLC

(57) ABSTRACT

A method for calibrating a value of an environmental condition derived information supplied by a wireless tag comprises: determining a value of an environmental condition impacting the wireless tag based on (i) information supplied by the wireless tag and (ii) a tag calibration model of the computing system; when a difference between the determined value of the environmental condition and a measurement of the environmental condition made by a user device exceeds a prescribed threshold, updating in real time, the tag calibration model, substituting the measurement of the environmental condition made by the user device for the determined value, and supplying in real time, as an output, the substituted measurement of the environmental condition made by the user device as if it was the value of the environmental condition derived from information supplied by the wireless tag.

20 Claims, 4 Drawing Sheets

WIRELESS TAG CALIBRATION

TECHNICAL FIELD

This invention relates to wireless tags and their ability to sense various environmental conditions.

BACKGROUND

Wireless tags, which may be referred to hereinafter simply as "tags" or individually as a "tag", are impacted by various environmental conditions, e.g., humidity, ambient temperature, light, air pressure, and so forth. These conditions can influence various signals that are detected or generated by the tag. For example, certain frequencies in the tag may change as a result of the impact of one or more of the environmental conditions. By monitoring the affected signals conclusions may be drawn about the environmental conditions in the vicinity of the tag that caused the signals to be what they are. To do so, various values of the affected signals are transmitted from the tag to a processor, which may be local or in the cloud, and the values are input to a model which determines a "measurement", i.e., a value, for the environmental condition.

However, due to the nature of a tag, it is expected that the values of the affected signals which are transmitted from the tag will drift over time. To compensate for such drift, calibration must be performed from time to time so that the values of the affected signals supplied from the tag may be turned into accurate measurements of the environmental factors.

Unfortunately, performing such calibration with only the tag and the processor can be challenging.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for calibrating a value of an environmental condition derived information supplied by a wireless tag. The method comprises: determining, by a computing system, a value of an environmental condition impacting the wireless tag based on (i) information supplied by the wireless tag and (ii) a tag calibration model of the computing system; comparing, by the computing system, the determined value of the environmental condition with a measurement of the environmental condition made by a user device; when a difference between the determined value of the environmental condition and the measurement of the environmental condition made by a user device exceeds a prescribed threshold, updating, by the computing system, in real time, the tag calibration model, substituting, by the computing system, the measurement of the environmental condition made by the user device for the determined value, and supplying, by the computing system, in real time, as an output, the substituted measurement of the environmental condition made by the user device as if it was the value of the environmental condition derived from information supplied by the wireless tag.

Certain embodiments disclosed herein include a method for calibrating a condition of an object associated with a wireless tag, the condition being based on a plurality of environmental conditions for which values have been derived over time based on raw tag measurements supplied by the wireless tag and a tag calibration model employed for each environmental condition. The method comprises: determining, at a computing system, a value of the condition of the object based on the values derived over time based and a tag calibration model for the condition of the object; comparing, by the computing system, the determined value of the condition of the object based on the values derived over time based and the tag calibration model for the condition of the object with a measurement of the condition of the object made by a user device; when a difference between the determined value of the condition of the object based on the values derived over time based and the tag calibration model for the condition of the object and the measurement of the condition of the object made by a user device exceeds a prescribed threshold, updating, by the computing system, in real time, the tag calibration model for the condition of the object, substituting, by the computing system, the measurement of the condition of the object made by the user device made for the determined value of the condition of the object, and supplying, by the computing system, in real time, as an output, the substituted measurement of condition of the object made by the user device as if it was the value of the condition of the object determined based on the values derived over time based and a tag calibration model for the condition of the object.

Certain embodiments disclosed herein include a system for calibrating a value of an environmental condition derived information supplied by a wireless tag. The system comprises: a processing circuitry; and a memory, the memory containing instructions that, when executed by the processing circuitry, configure the system to: determine a value of an environmental condition impacting the wireless tag based on (i) information supplied by the wireless tag and (ii) a tag calibration model of the system; compare the determined value of the environmental condition with a measurement of the environmental condition made by a user device; when a difference between the determined value of the environmental condition and the measurement of the environmental condition made by a user device exceeds a prescribed threshold, update, in real time, the tag calibration model, substitute the measurement of the environmental condition made by the user device for the determined value, and supply, in real time, as an output, the substituted measurement of the environmental condition made by the user device as if it was the value of the environmental condition derived from information supplied by the wireless tag.

Certain embodiments disclosed herein include a system for calibrating a condition of an object associated with a wireless tag, the condition being based on a plurality of environmental conditions for which values have been derived over time based on raw tag measurements supplied by the wireless tag and a tag calibration model employed for each environmental condition. The system comprises: a processing circuitry; and a memory, the memory containing instructions that, when executed by the processing circuitry, configure the system to: determine a value of the condition of the object based on the values derived over time based and a tag calibration model for the condition of the object; compare the determined value of the condition of the object based on the values derived over time based and the tag calibration model for the condition of the object with a measurement of the condition of the object made by a user device; when a difference between the determined value of the condition of the object based on the values derived over time based and the tag calibration model for the condition of the object and the measurement of the condition of the object made by a user device exceeds a prescribed threshold, update in real time, the tag calibration model for the condition of the object, substitute the measurement of the condition of the object made by the user device made for the determined value of the condition of the object, and supply, in real time, as an output, the substituted measurement of condition of the object made by the user device as if it was the value of the condition of the object determined based on the values derived over time based and a tag calibration model for the condition of the object.

DETAILED DESCRIPTION

Figure 1:
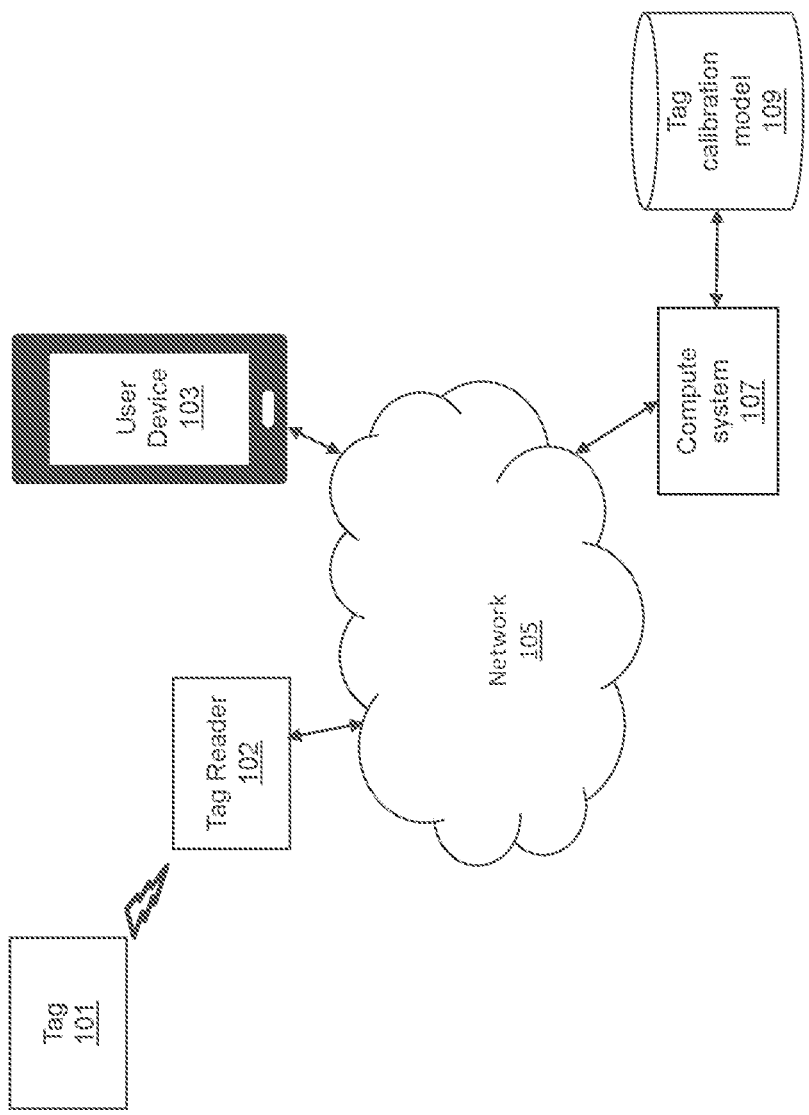
FIG. 1 shows an illustrative hardware environment employed to sense various environmental conditions in accordance with the principles of the disclosure.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In accordance with the principles of the disclosure, calibration of a tag that is used to perform measurements of one or more environmental conditions is coordinated with a user device, such as, for example, a mobile phone or tablet, which, for convenience, may be hereinafter referred to herein for convenience of reference as a mobile phone. Advantageously, doing so allows correction of drift of measurements produced from values that are transmitted from the tag which may be derived from signals affected by the environmental condition or from data generated by one or more sensors on the tag. In this regard, it should be appreciated that a mobile phone typically has specific sensors that more directly measure the environmental conditions of interest and that measurements produced by the mobile phone are typically likely to be more accurate than those derived from the values of signals affected by the environmental condition or from one or more sensors that are transmitted from the tag. In addition, in accordance with an aspect of the disclosure, the calibration model used to convert the values of signals affected by the environmental condition that are transmitted from the tag transmitted from the tag into a measurement of an environmental condition may be updated based on the value of the environmental condition indicated by the mobile phone.

Also, the condition of an object to which a tag is attached, such as freshness thereof, may be determined by employing measurements produced over time from values that are transmitted from the tag for a plurality of environmental conditions. Such conditions may be determined in conjunction with their own model, e.g., an object condition model, such as a tag freshness calibration model, and when the value of such condition, e.g., freshness calibration, diverges from that made contemporaneously by a mobile phone, the value determined by the mobile phone may be substituted for that based on tag measurements and the object condition model, e.g., a tag freshness calibration model, may be updated to conform to the value determined by the mobile phone.

FIG. 1 shows an illustrative hardware environment employed to sense various environmental conditions in accordance with the principles of the disclosure. Shown in FIG. 1 are tag 101, tag reader 102, user device 103, network 105, compute system 107 and tag calibration model 109. Tag reader 102, user device 103, and compute system 107 are coupled via network 105. Tag 101 is wirelessly communicatively coupled to tag reader 102, and hence is further communicatively coupled via network 105, e.g., to compute system 107. Compute system 107 is communicatively coupled to tag calibration model 109. Note that in some embodiments compute system 107 and tag calibration model 109 may be coupled via a network, e.g., network 105.

Tag 101 is a conventional wireless tag known in the art, e.g., one of Wiliot's IoT Pixels, and, in particular, one of Humidity Sensing IoT Pixels and Light Sensing IoT Pixels. Tag 101 may employ a battery or be battery-less and rely solely on harvested energy. Such tags typically use Bluetooth® and Bluetooth low energy (BLE) for wireless communication over the 2.4 GHz industrial, scientific and medical (ISM) band. Other low energy communication protocols include LoRa, nRF, DECT® Ultra Low Energy (DECT ULE), Zigbee®, Z-Wave®, EnOcean®, and the like can be used for wireless tags in a similar manner to Bluetooth and BLE. For simplicity and pedagogical purposes, this disclosure uses BLE as an illustrative example, although the disclosure is applicable to tags that employ such other low energy communication protocols.

Tag reader 102 communicates with tag 101 using the low-energy communications protocol and may relay messages between tag 101 and network 105. Thus, messages may be transmitted from tag 101 and delivered to compute system 107 and vice versa.

User device 103 is typically a mobile phone, although it may be, a personal computer, a laptop, a tablet computer, a wearable computing device, or other similar device. User device 103 may also be a tag reader, i.e., bridge, or any nearby network device provided that it has the necessary sensors, e.g., humidity sensor or a camera. User device 103 has the ability to sense at least one environmental condition and, in particular, the environmental condition for which it will be used to calibrate tag 101. User device 103 may contain one or more dedicated sensors to sense the at least one or more environmental conditions, or it may use other technology to perform the sensing. For example, there are environmental sensors in phones of the Android platform. The techniques of this disclosure are agnostic to the particular way in which user device 103 performs the sensing. User device 103 may also detect the presence of tag 101 as described further hereinbelow.

Network 105 may be, but is not limited to, a wireless, cellular or wired network, a local area network (LAN), a wide area network (WAN), a metro area network (MAN), the Internet, the worldwide web (WWW), similar networks, and any combination thereof.

Compute system 107 may be deployed locally, e.g., a local computer or server, it may be deployed in the cloud, or it may be part of a cloud computing platform. Such a cloud computing platform may include a public cloud, a private cloud, a hybrid cloud, or combination thereof.

Tag calibration model 109 stores a model that is used to convert information, e.g., raw measurements, that are received from the tag at compute system 107 into an actual measurement of an environmental condition. The model may be a previously trained model for making such conversions.

Figure 2:
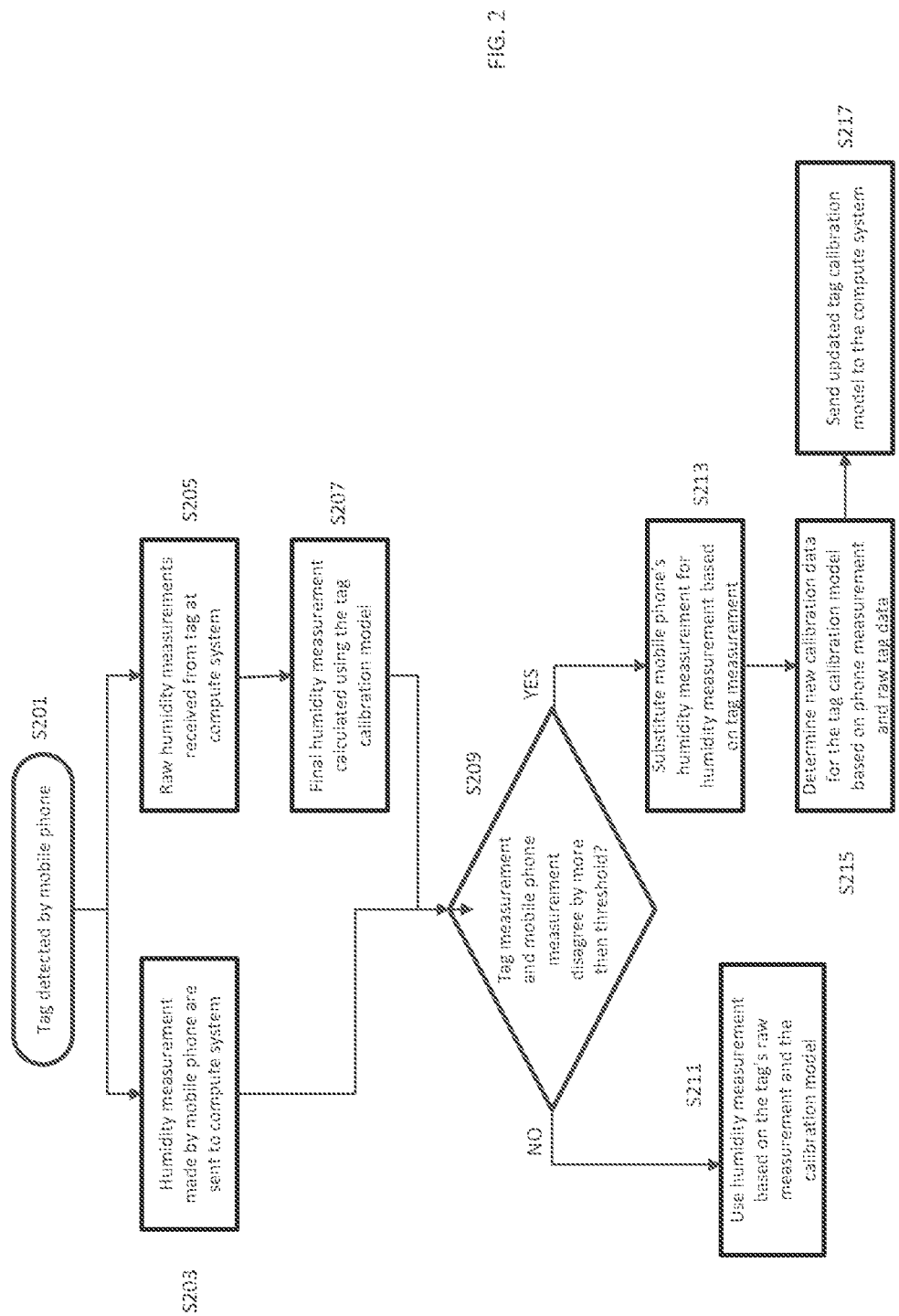
FIG. 2 shows a flowchart of an illustrative process for calibrating a tag in coordination with a mobile phone, in accordance with the principles of the disclosure.

FIG. 2 shows a flowchart of an illustrative process for calibrating a tag in coordination with a mobile phone, in accordance with the principles of the disclosure. For purposes of illustration, in FIG. 2 the environmental condition being monitored is humidity. However, the description is equally applicable to other environmental conditions, e.g., ambient temperature, light, and air pressure, freshness, and the like, as noted above.

The process is entered in S201 when a tag, e.g., tag 101, is detected by a mobile phone, e.g., mobile phone 103. This detection may be done by an application executing on the mobile phone. In one embodiment, such detection is performed by the mobile phone optically detecting the tag. For example, the mobile phone could detect a bar code printed on the tag using the mobile phone's camera, the bar code serving to identify, e.g., uniquely, which tag has been detected. In another embodiment the mobile phone may detect tag 101 by receiving BLE messages that are transmitted by the tag. Note that many mobile phones can receive BLE messages. There are BLE messages that contain a unique identifier supplied by the tag and such identifier may be used to identify the tag. In the event that the BLE messages are encrypted, mobile phone 103 can send the message to compute system 107 to be decrypted and then receive back the decrypted message.

Next, S203 may be performed in parallel with S205 and S207. In S203 a humidity measurement is made by the mobile phone and sent to a compute system, e.g., compute system 107. In S205, raw humidity measurements are received from the tag at the compute system. In one embodiment, the raw humidity measurements from the tag could be measurements made by a sensor on the tag. In another embodiment, various functions of the tag are monitored as to how they change with changes of humidity. For example, one or more frequencies that are measured as a byproduct of other processes, such as an energization rate or a communication calibration, e.g., frequencies that are calibrated when a beacon is received and a tag prepares to transmit, may change in response to humidity conditions. The raw humidity measurements correspond to the values of these frequencies and do not directly indicate the humidity level itself but must be processed by the compute system using a tag calibration model, e.g., tag calibration model 109, in order to derive the humidity level. Then, in S207, the actual humidity level detected by the tag, i.e., the final humidity measurement, is calculated by the compute system using the tag calibration model. This is typically, though not necessarily, based on more than one raw humidity measurement and, indeed, possibly many more.

After performance of S203 and S207, control passes to conditional branch point S209 which tests to determine if the final humidity measurement that was derived based on the raw humidity measurements received from tag and the humidity measurement received from the mobile phone measurement disagree by more than a prescribed threshold. S209 may be performed by the compute system. If the test result in S209 is NO, indicating that the difference between the value determined by the mobile phone and the tag is less than the threshold, i.e., it is not considered to be very large, control passes to S211 and the humidity measurement based on the tag's raw measurement and the calibration model is employed and supplied as an output, e.g., by the compute system, that indicates the currently measured humidity. In other words, the humidity measurement calculated in S207 is employed and the humidity measurement from the mobile phone is ignored. In this regard, no update of the tag calibration model is required, and it is assumed that the tag calibration model is working reasonably accurately. The process is then exited, or control may be passed back to S201.

If the test result in S209 is YES indicating that the difference between the value determined by the mobile phone and the tag is greater than the threshold, i.e., it is considered to be relatively large, control passes to S213 and the mobile phone's humidity measurement is employed in real time as the tag's humidity measurement in lieu of employing the humidity measurement calculated in S207 based on the tag's raw humidity measures. The mobile phone's humidity measurement is supplied as an output, e.g., by the compute system, that indicates the currently measured humidity as if such was determined based on the tag raw data and using the tag calibration model. The rationale for doing so is the presumption is that it is more likely that the values of the tag have drifted and thus the value of the mobile phone is more reliable. In particular, the mobile phone is trusted more because it is an actively managed device and thus there is an expectation that its value is more accurate.

In an embodiment, an action, such adjusting a level of an environmental control system, may be instigated or automatically performed when the humidity level being output reaches a prescribed level.

In one embodiment, the prescribed threshold may be in a range of 1% to 25%. The threshold value selected may depend upon the particular environmental condition being monitored. For example, temperature sensing by a tag is fairly accurate, so the threshold may be set smaller, e.g., 1%, as such could represent a significant difference between the tag measurement and the phone measurement. Humidity sensing is less accurate, and therefore a larger threshold, e.g., 10%, may be warranted to indicate a difference significant enough to employ the mobile phone measurement in view of that developed based on the tag raw humidity measurements. The threshold value may also, or instead, be based on a desired accuracy or a known tendency for the raw tag data to drift.

Control next passes to S215 in which new calibration data for the tag calibration model based on phone measurement and raw tag data is determined in real time, e.g., by the compute system. In this regard, it should be appreciated that the measurement derived from the raw humidity measurements received from tag is only as good as the tag calibration model. Therefore, the model is updated, e.g., by the compute system, to accommodate for the apparent drift over time of the input supplied thereto by the tag. The updating of the tag calibration model is performed in real time because the raw tag data arrives fairly quickly and it is desirable that the tag calibration model should be updated in time for receipt of the next packet from the tag with new raw data so that the actual humidity level detected by the tag, i.e., the final humidity measurement, which is based on the tag calibration model, is as accurate as possible.

Thereafter, in S217 the updated tag calibration model is sent to the compute system which stores the updated model, e.g., in tag calibration model 109. The process is then exited, or control may be passed back to S201.

Figure 3:
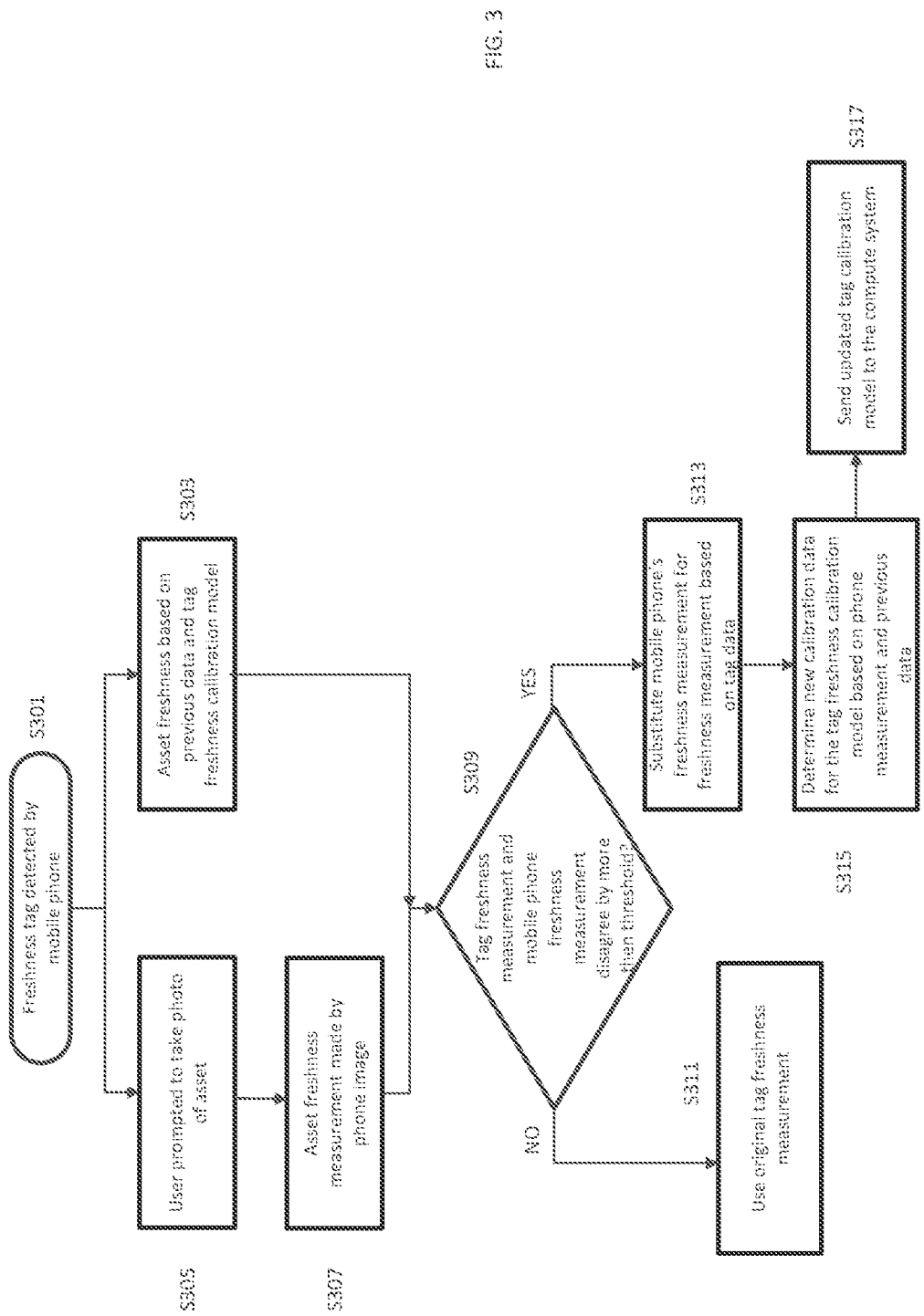
FIG. 3 is a flowchart of an illustrative process for calibrating a tag for determining the freshness of an in coordination with a mobile phone, in accordance with the principles of the disclosure.

FIG. 3 shows a flowchart of an illustrative process for calibrating a tag for determining the freshness of an asset, i.e., an item, such as a food item, to which the tag is associated, e.g., attached, in coordination with a mobile phone, in accordance with the principles of the disclosure. Freshness of food is a concept well known in the art. However, the description is equally applicable to other conditions in which an asset decays over a period.

It should be appreciated that, as an illustrative example and to a first approximation, in one embodiment a freshness model may be operative to calculate how many days off the expected shelf life of the asset, e.g., the food item such as produce, associated with the tag is, based on the environmental conditions, e.g., temperature and humidity conditions, that the asset has been exposed to. In other words, the model may determine by how many days the shelf life of the asset is reduced as compared to the expected shelf life of the asset had it been subject to ideal conditions of the environmental conditions. Thus, freshness may be viewed as a decay rate based on, e.g., caused by, the environmental conditions to which the asset has been exposed over time.

Given that the tag is associated with the asset, e.g., attached thereto, the tag and the asset have been exposed to the same environmental conditions over time, e.g., at least since the tag was attached to the asset, which may be set as a starting point. Thus, the environmental conditions as measured by the tag may be used to determine freshness of the asset attached thereto. It should also be appreciated that a visual inspection of the asset is considered to be a more accurate and trustworthy measure of freshness because freshness is affected by other factors, e.g., beyond temperature humidity, and any other environmental conditions actually measured by a tag, that a tag may not be usable to measure.

The process is entered in S301 when a tag, e.g., tag 101, is detected by a mobile phone, e.g., mobile phone 103. This detection may be done by an application executing on the mobile phone. In one embodiment, such detection is performed by the mobile phone optically detecting the tag. For example, the mobile phone could detect a bar code printed on the tag using the mobile phone's camera, the bar code serving to identify, e.g., uniquely, which tag has been detected. In another embodiment, the mobile phone may detect tag 101 by receiving one or more BLE messages that are transmitted by the tag. Note that many mobile phones can receive BLE messages. There are BLE messages that contain a unique identifier that is used to identify the tag. In the event that the BLE messages are encrypted, mobile phone 103 can send the message to compute system 107 to be decrypted receive back and then the decrypted message.

Next, S303 may be performed in parallel with S305 and S307. In S305 the user is prompted to use the mobile phone to take an image of the asset using a camera of the mobile phone. Next, in S307. a freshness measurement is made by the mobile phone based on the image and the freshness measurement is transmitted to a compute system, e.g., compute system 107. Such freshness measurement may be derived from the image using a model that has been trained to determine freshness of an asset based on a received image.

In S303, an asset freshness, i.e., the freshness of the object with which the tag is associated, is determined by the compute system based on a history of environmental condition measurements, such as temperature and humidity, that have been determined and collected by the compute system based on the raw measurements that were reported by the tag to the compute system and using the tag calibration model for those conditions, e.g., as described hereinabove in connection with S205 and S207 and using a tag freshness calibration model.

After performance of S303 and S307, control passes to conditional branch point S309 which tests to determine if the freshness measurement that was derived based on the historical data and the freshness measurement received from the mobile phone measurement disagree by more than a prescribed threshold. In one embodiment, the prescribed threshold may be 10%. However, as noted above, the threshold may be set differently within a range, e.g., 1% to 25%. Furthermore, the threshold may be based on the nature of the asset whose freshness is being measured. The threshold may also, or in the alternative, be based on the known tendency of the raw measurements received from the tag for the environmental conditions employed to determine freshness to drift.

If the test result in S309 is NO, indicating that the difference between the freshness value determined by the mobile phone and the freshness value determined based on the history of environmental condition measurements that have been determined and collected by the compute system based on the raw measurements that were reported by the tag is less than the threshold, i.e., it is not very large, control passes to S311 and the freshness measurement based on the tag's previous data and the tag freshness calibration model is employed. As such, the freshness measurement based on the tag's previous data and the tag freshness calibration model is supplied as an output, e.g., by the compute system, to indicate the currently measured freshness. In other words, the freshness measurement calculated in S303 is employed as an output and the freshness measurement made by the mobile phone in S307 is ignored. In this regard, no update of the tag calibration model for freshness, i.e., a tag freshness calibration model, is required, and it is assumed that the a tag freshness calibration mode is working reasonably accurately. The process is then exited, or control may be passed back to S301.

In an embodiment, an action, such as reducing a price of the object or moving the object into a different storage area having different environmental conditions, or adjusting a level of an environmental control system, may be instigated or automatically performed in the event that the freshness reaches a prescribed level.

If the test result in S309 is YES indicating that the difference between the value determined by the mobile phone and the historical environmental condition measurements and tag freshness calibration model, i.e., as calculated in S303, is greater than the threshold, i.e., it is relatively large, control passes to S313 and the mobile phone's freshness measurement is employed for the tag in lieu of the freshness measurement calculated in S303. The basis for doing so is the presumption that the values measured by the tag have drifted and the value determined by the mobile phone from the image is more reliable, as indicated hereinabove. As such, the freshness measurement value determined by the mobile phone is supplied as an output, e.g., by the compute system, to indicate the currently measured freshness. In other words, the freshness measurement calculated in S307 is employed as an output and the freshness measurement made by the mobile phone in S303 is ignored.

Control next passes to S315 in which new calibration data for the tag freshness calibration model based on phone measurement and measurements of environmental conditions based on tag data is determined in real time.

In an embodiment, in S315, new calibration data for the tag freshness calibration model may be achieved by having the state of the tag freshness calibration model be advanced to match the freshness measurement made by the mobile phone, i.e., to move the lifetime of the asset to the point in the tag freshness calibration model that matches the mobile phone's freshness measurement. This may be achieved by restarting the tag freshness calibration model at the freshness level corresponding to the freshness measurement made by the mobile phone and let the tag freshness calibration model continue from there. In another embodiment the slope of decay employed by the tag freshness calibration model may be adjusted so that it correctly intersects with the point corresponding to the freshness measurement made by the mobile phone.

It should also be appreciated that the freshness measurement derived from the raw tag measurements received from tag, e.g., of temperature and humidity, is only as good as the tag calibration models for those environmental conditions. Therefore, the model for one or more of the underlying tag measurements that are employed to make up the freshness measurement may also be updated to accommodate for the apparent drift over time of the inputs supplied thereto by the tag. Each such updated tag calibration model is sent to the compute system which stores such updated models, e.g., in tag calibration model 109, as described hereinabove in connection with S215 and S217 (FIG. 2). This process of updating the model for one or more of the underlying tag measurements may also proceed independently of the process of FIG. 3.

Thereafter, in S317 (FIG. 3), the updated tag freshness calibration model is sent to the compute system which stores the updated tag freshness calibration model, e.g., in tag calibration model 109. The process is then exited, or control may be passed back to S301.

Figure 4:
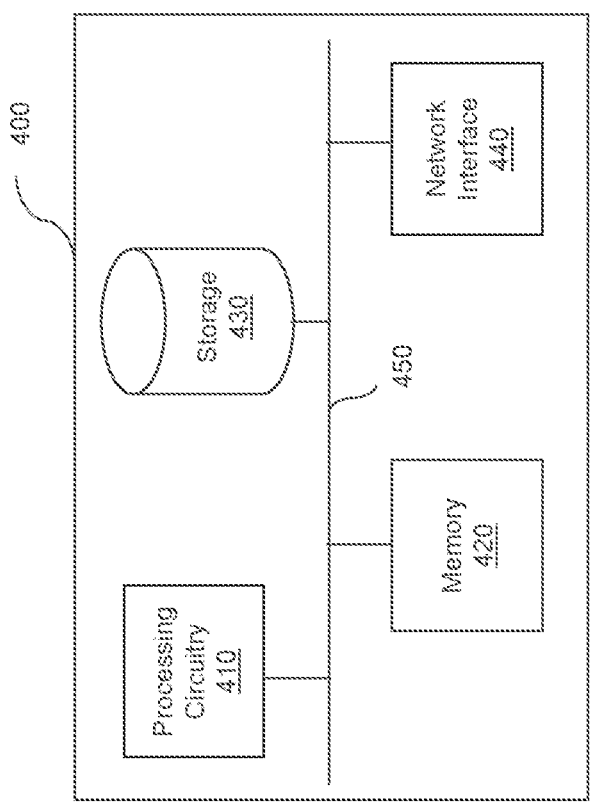
FIG. 4 shows an illustrative system 130 according to an embodiment.

FIG. 4 shows an illustrative system 400 according to an embodiment. System 400 may be used to implement one or more of compute system 107, user device 103, tag reader 102, and even portions of tag 101. System 400 includes a processing circuitry 410 coupled to a memory 420, a storage 430, and a network interface 440. In an embodiment, the components of the system 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile, e.g., random access memory, etc., non-volatile, e.g., read only memory, flash memory, etc., or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code, e.g., in source code format, binary code format, executable code format, or any other suitable format of code. The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Video Disks (DVDs), or any other medium which can be used to store the desired information.

The network interface 440 allows the system 400 to communicate with other elements of an overall system, e.g., elements such as are shown in FIG. 1. Network interface 440 may provide for wired communication, wireless communication, or a combination of both and may employ one or more communication protocols.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, firmware executing on hardware, software, software executing on hardware, or any combination thereof. Moreover, the software is implemented tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be implemented as either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for calibrating a value of an environmental condition derived information supplied by a wireless tag comprises:
   determining, by a computing system, a value of an environmental condition impacting the wireless tag based on (i) information supplied by the wireless tag and (ii) a tag calibration model of the computing system;
   comparing, by the computing system, the determined value of the environmental condition with a measurement of the environmental condition made by a user device;
   when a difference between the determined value of the environmental condition and the measurement of the environmental condition made by a user device exceeds a prescribed threshold,
      updating, by the computing system, in real time, the tag calibration model,
      substituting, by the computing system, the measurement of the environmental condition made by the user device for the determined value, and
      supplying, by the computing system, in real time, as an output, the substituted measurement of the environmental condition made by the user device as if it was the value of the environmental condition derived from information supplied by the wireless tag.

2. The method of claim 1, wherein information supplied by the wireless tag comprises raw tag data.

3. The method of claim 2, wherein updating the tag calibration model employs new calibration data based on the measurement of the environmental condition made by the user device and the raw tag data.

4. The method of claim 2, wherein the raw tag data comprises data from at least one sensor on the wireless tag.

5. The method of claim 2, wherein the raw tag data does not directly indicate a value of the environmental condition but rather indicates a change in at least one function of the wireless tag that is processed using the tag calibration model to derive the value of the environmental condition.

6. The method of claim 5 wherein the at least one function is a change of a frequency that is calibrated in response to receipt of a beacon.

7. The method of claim 1, wherein the user device is close enough to the wireless tag to detect the wireless tag.

8. The method of claim 7, wherein the user device detects the wireless tag by at least one of using a camera of the user device to optically detect the wireless tag and detecting use of a low-energy communication protocol by the wireless tag.

9. The method of claim 1, wherein the environmental condition is at least one of humidity, ambient temperature, light, and air pressure.

10. The method of claim 1, further comprising:
    when the difference between the determined value of the environmental condition and the measurement of the environmental condition made by a user device is less than or equal to the prescribed threshold, supplying, in real time, as an output, the value of the environmental condition derived from information supplied by the wireless tag.

11. A method for calibrating a condition of an object associated with a wireless tag, the condition being based on a plurality of environmental conditions for which values have been derived over time based on raw tag measurements supplied by the wireless tag and a tag calibration model employed for each environmental condition, the method comprising:
    determining, at a computing system, a value of the condition of the object based on the values derived over time based and a tag calibration model for the condition of the object;
    comparing, by the computing system, the determined value of the condition of the object based on the values derived over time based and the tag calibration model for the condition of the object with a measurement of the condition of the object made by a user device;
    when a difference between the determined value of the condition of the object based on the values derived over time based and the tag calibration model for the condition of the object and the measurement of the condition of the object made by a user device exceeds a prescribed threshold,
       updating, by the computing system, in real time, the tag calibration model for the condition of the object,
       substituting, by the computing system, the measurement of the condition of the object made by the user device made for the determined value of the condition of the object, and
       supplying, by the computing system, in real time, as an output, the substituted measurement of condition of the object made by the user device as if it was the value of the condition of the object determined based on the values derived over time based and a tag calibration model for the condition of the object.

12. The method of claim 11, further comprising:
    when a difference between the determined value of the condition of the object based on the values derived over time based and the tag calibration model for the condition of the object and the measurement of the condition of the object made by a user device is less than or equal to a prescribed threshold, supplying, in real time, as an output, the determined value of the condition of the object based on the values derived over time based and the tag calibration model for the condition of the object.

13. The method of claim 11, wherein the condition of the object is freshness.

14. The method of claim 11, wherein the measurement of the condition of the object made by a user device is based on an image taken by a camera of the user device.

15. The method of claim 11 further comprising:
    detecting the tag by the user device at least prior to the comparing.

16. The method of claim 15, wherein the user device detects the wireless tag by at least one of using a camera of the user device to optically detect the wireless tag and detecting use of a low-energy communication protocol by the wireless tag.

17. A system for calibrating a value of an environmental condition derived information supplied by a wireless tag, comprising:
- a processing circuitry; and
- a memory, the memory containing instructions that, when executed by the processing circuitry, configure the system to:
- determine a value of an environmental condition impacting the wireless tag based on (i) information supplied by the wireless tag and (ii) a tag calibration model of the system;
- compare the determined value of the environmental condition with a measurement of the environmental condition made by a user device;
- when a difference between the determined value of the environmental condition and the measurement of the environmental condition made by a user device exceeds a prescribed threshold,
  - update, in real time, the tag calibration model,
  - substitute the measurement of the environmental condition made by the user device for the determined value, and
  - supply, in real time, as an output, the substituted measurement of the environmental condition made by the user device as if it was the value of the environmental condition derived from information supplied by the wireless tag.

18. The system of claim 17, further configured to:
when the difference between the determined value of the environmental condition and the measurement of the environmental condition made by a user device is less than or equal to the prescribed threshold, supplying, in real time, as an output, the value of the environmental condition derived from information supplied by the wireless tag.

19. A system for calibrating a condition of an object associated with a wireless tag, the condition being based on a plurality of environmental conditions for which values have been derived over time based on raw tag measurements supplied by the wireless tag and a tag calibration model employed for each environmental condition, comprising:
- a processing circuitry; and
- a memory, the memory containing instructions that, when executed by the processing circuitry, configure the system to:
- determine a value of the condition of the object based on the values derived over time based and a tag calibration model for the condition of the object;
- compare the determined value of the condition of the object based on the values derived over time based and the tag calibration model for the condition of the object with a measurement of the condition of the object made by a user device;
- when a difference between the determined value of the condition of the object based on the values derived over time based and the tag calibration model for the condition of the object and the measurement of the condition of the object made by a user device exceeds a prescribed threshold,
  - update in real time, the tag calibration model for the condition of the object,
  - substitute the measurement of the condition of the object made by the user device made for the determined value of the condition of the object, and
  - supply, in real time, as an output, the substituted measurement of condition of the object made by the user device as if it was the value of the condition of the object determined based on the values derived over time based and a tag calibration model for the condition of the object.

20. The system of claim 19, further configured to:
when a difference between the determined value of the condition of the object based on the values derived over time based and the tag calibration model for the condition of the object and the measurement of the condition of the object made by a user device is less than or equal to a prescribed threshold, supply, in real time, as an output, the determined value of the condition of the object based on the values derived over time based and the tag calibration model for the condition of the object.

* * * * *